(No Model.)
M. DEW.
SELF RAKING ATTACHMENT FOR REAPERS AND HARVESTERS.
No. 337,751. Patented Mar. 9, 1886.
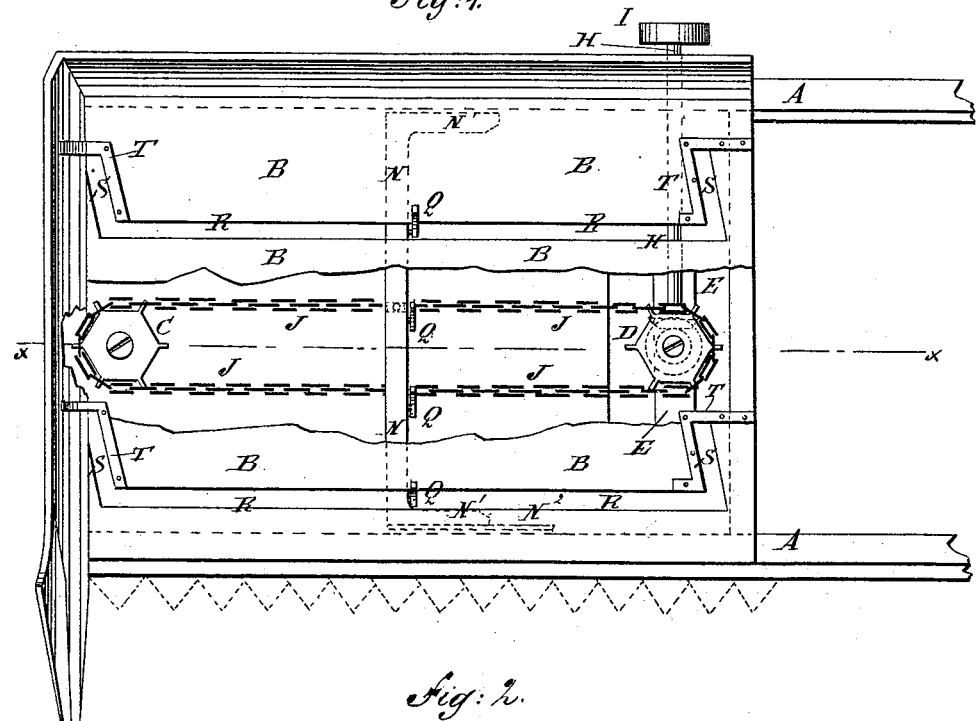
Fig. 1.
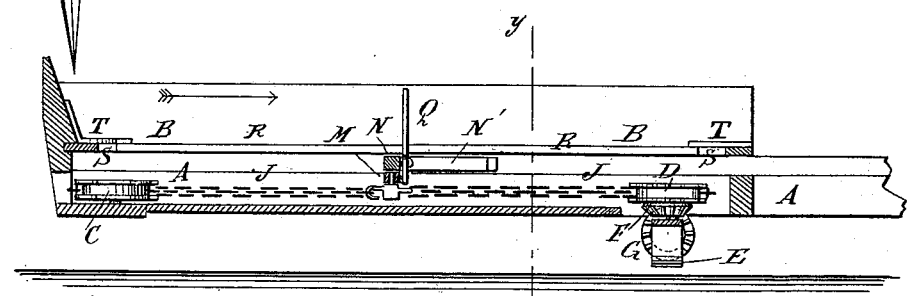
Fig. 2.
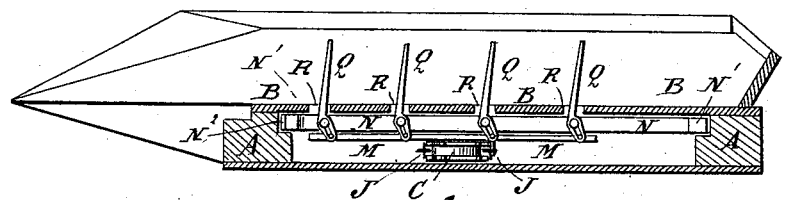
Fig. 3.
Fig. 4.
WITNESSES:
INVENTOR:
M. Dew
BY Munn & Co.
ATTORNEYS.

United States Patent Office.

MARTIN DEW, OF CASS CITY, MICHIGAN.

SELF-RAKING ATTACHMENT FOR REAPERS AND HARVESTERS.

SPECIFICATION forming part of Letters Patent No. 337,751, dated March 9, 1886.

Application filed March 9, 1885. Serial No. 158,257. (No model.)

*To all whom it may concern:*

Be it known that I, MARTIN DEW, of Cass City, in the county of Tuscola and State of Michigan, have invented a new and useful Improvement in Self-Raking Attachments for Reapers and Harvesters, of which the following is a full, clear, and exact description.

Reference is to be had to the accompanying drawings, forming a part of this specification, in which similar letters of reference indicate corresponding parts in all the figures.

Figure 1 is a plan view of the platform of a reaper or harvester to which my improvement has been applied, parts being broken away. Fig. 2 is a sectional front elevation of the same, taken through the line $x\ x$, Fig. 1. Fig. 3 is a sectional end elevation of the same, taken through the line $y\ y$, Fig. 2. Fig. 4 is a sectional elevation of a part of the rake-head enlarged.

The object of this invention is to provide self-raking attachments for reapers and harvesters, which shall be simple in construction and reliable in operation.

The invention relates to a self-raking attachment for reapers and harvesters, constructed with a slotted platform, and an endless chain passing around chain-wheels driven from the driving mechanism of the reaper or harvester, and provided with a pin engaging with a socket sliding upon a bar having a slot of a less length than the movement of the said pin, the slotted bar sliding upon a bar having projecting arms and sliding in rabbets in the platform-frame, and the rake-teeth pivoted to both the sliding bars, whereby the said rake-teeth will be projected and withdrawn at the proper times, as will be hereinafter fully described.

A represents the platform-frame, and B the platform, of a reaper or harvester. C D are two chain-wheels, the one, C, of which is pivoted to the frame A of the platform near its outer end, or to a support attached to the said frame. The other chain-wheel, D, is pivoted to a bar, E, which is firmly secured to the platform-frame A at or near the inner end of the platform B.

To the lower side of the chain-wheel D is attached, or upon it is formed, a small beveled gear-wheel, F, into the teeth of which mesh the teeth of the small beveled gear-wheel G, attached to the inner end of the shaft H. The shaft H revolves in bearings attached to the bar E, which bar has a downward bend formed in it to provide space for the gear-wheel G.

To the outer end of the shaft H is attached a pulley or chain-wheel, I, to receive a belt or chain from the driving mechanism of the reaper or harvester.

Around the chain-wheels C D passes an endless chain, J, to one of the links of which is attached a pin, K, working in a socket, L, sliding in a slot in a bar, M, placed against the lower side of the bar N, and secured in place by screws O, passing through slots P in the bar M and screwing into the bar N.

To the bar M are pivoted the slotted laterally-inclined lower ends of the rake-teeth Q, which are pivoted near their lower ends to the bar N, so that the said rake-teeth can be raised into a vertical position and lowered into a horizontal position by sliding the bar M longitudinally upon the bar N.

Upon the ends of the cross-bar N are formed forwardly-projecting arms N', which rest and slide in rabbets in the front and rear bars of the frame A, to cause the said cross-bar to move squarely as it is drawn forward and back by the travel of the endless chain J. The wear of the arms N' is taken up by a spring, N², attached to one of the said arms and resting against the shoulder of the rabbet in which the said arm slides. With this construction, as the shaft H is rotated the endless chain J will be carried around the chain-wheels C D, and as the link bearing the pin K passes around each of the said chain-wheels it moves the socket L in the slot P' in the bar M through the length of the said slot, and then carries the said bar with it until the said socket has traveled a distance equal to the diameter of the chain-wheels C D. The slot P' is so much shorter than the diameter of the chain-wheels C D that the bar M will have enough movement to turn the rake-teeth Q from a horizontal to a vertical position as the pin K travels around the outer side of the chain-wheel C, and from a vertical to a horizontal position when the said pin K passes around the outer side of the chain-wheel D, so that the said rake-teeth Q will be in vertical positions while traveling from the outer to the inner end of the platform, and in horizontal positions when traveling from the inner to the outer end of the said platform. The teeth Q, when in a horizontal position, are below the platform B, and when in a vertical position project through longitudinal slots R in the said platform. The slots R at their ends are connected with inclined slots S, through which the rake-teeth move when passing from one position to the other as the pin K is being carried around the chain-wheels C D. The parts of the platform B weakened by the forming of the inclined slots S are strengthened by metallic straps T, secured to the said platform along the inner edges of the said inclined slots. The outer ends of the straps T, at the outer ends of the slots S, extend outward and are secured to the platform-frame A. With this construction the rake-teeth as they move inward collect the grain into a gavel and deliver it, in the case of a reaper, upon the ground, and in the case of a harvester to a binding mechanism. The rake-teeth as they move outward are beneath the platform, and thus out of the way of the falling grain.

It should be mentioned that the teeth Q, when passing around the chain-wheel D, remain in a vertical position while the said wheel is making about one-fourth of a revolution, or, in other words, while the socket L is moving the length of the slot P'. This is important when the improvement is applied to a self-binding harvester, for the gavel will be held in compact position long enough for the needle carrying twine to pass downward far enough around in the arc of a circle to hold and compress the bundle before the teeth Q return to a horizontal position.

Having thus described my invention, I claim as new and desire to secure by Letters Patent—

In a self-raking attachment for reapers and harvesters, the combination, with the platform-frame A, the platform B, having slots R S, and the endless chain J, passing around the chain-wheels C D and driven from the driving mechanism of the said reaper or harvester, of the pin K, the sliding socket L, the sliding cross-bar M, having slot P', the sliding cross-bar N, having arms N', and the rake-teeth Q, pivoted to the bars M N, substantially as herein shown and described, whereby the said teeth will be projected and withdrawn at the proper times, as set forth.

MARTIN DEW.

Witnesses:
HUGH McALPIN,
A. D. SELLERS.